Aug. 12, 1952     E. H. STOFEL     2,606,547

SELF-HEATING CAN

Filed June 3, 1948

INVENTOR.
ERNEST H. STOFEL
BY
*F. R. Jenkins*
ATTORNEY

Patented Aug. 12, 1952

2,606,547

UNITED STATES PATENT OFFICE 2,606,547

SELF-HEATING CAN

Ernest H. Stofel, Elmhurst, N. Y., assignor to Thermo-Snack Inc., Elmhurst, N. Y., a corporation of New York Application June 3, 1948, Serial No. 30,947

5 Claims. (Cl. 126—262)

1

This invention relates to self-heating food cans and to other containers the contents of which are required to be raised to a moderate temperature where conventional sources of heat or fuel are not readily obtainable. The invention is particularly suitable to the preparation of hot foods or beverages on camping trips, picnics, explorations and the like.

One object of the invention is to provide such a can which will utilize conventional metal can forms and will not require the use of new machinery for production of the forms.

Another object is to provide heating or fuel means which will be reliable in strong winds, and which may be varied in accordance with the size of the container.

Another object is to provide a metal container which will require no can openers, key or accessories for opening the can.

Another object is to provide a self heating can having the above characteristics at a minimum cost and which will be safe in operation.

Still other objects will appear in the description of the invention as shown in connection with the self-heating can which briefly stated includes a metal container having disposed against the outer faces thereof a carbonaceous fiber covering impregnated with an oxidizing agent.

In the accompanying drawing showing, by way of example several of many possible embodiments of the invention:

Figure 1:
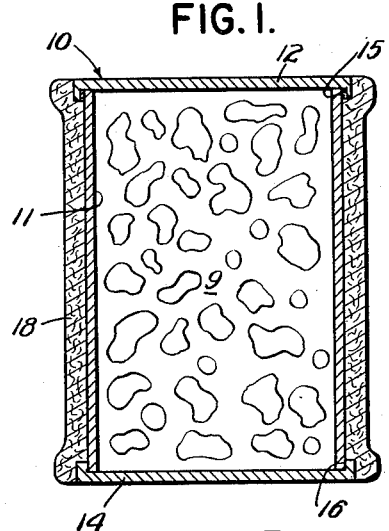
Fig. 1 is a cross sectional view of one form of the can and covering.

The self-heating can of Fig. 1 comprises a metal can or container 10 for the desired contents 9 such as food, beverage or any other material intended to be heated. The container 10, in turn is comprised of a cylindrical portion 11 having a top 12 and bottom 14 secured or sealed thereto. Preferably the top 12 is secured to the cylindrical portion by solder, as at 15, having a low melting point, about 165° F. being satisfactory. The bottom 14 is secured in any suitable manner, as at 16, such as by crimping, welding, soldering or even the same type of solder as used for securing the top.

2

The covering or casing 18 which, when burned, heats the contents 9 is in close contact with the walls of the container and is composed of carbonaceous combustible material such as felted wood pulp, cotton cloth, absorbent paper and the like and impregnated with an oxidizing agent which is preferably non-hygroscopic. The casing is prepared by soaking the paper or fibrous material in a saturated solution of the oxidizing agent such as potassium nitrate, potassium chlorate, or potassium chromate to mention only a few. The casing material is then dried. The thickness of the casing will obviously depend on the required number of B. t. u.'s to bring the contents of the container to the desired temperature which in turn will depend on the contents of the can and many other factors. I have found that when beans or soup are to be heated in a No. 1 or No. 2 can, blotting paper of about $\frac{1}{16}$ inch thickness is satisfactory. The rate of burning of the casing can be varied by the strength of the impregnating solution, but in general the time required for burning the casing such as shown in Fig. 1 and described above varies from about 30 secs. for a No. 1 can to about 50 secs. for a No. 2 can giving the contents of the can an average temperature of about 150° F. or a rise in temperature of about 80° to 100° F.

Furthermore I have found that despite the high temperatures produced by the burning casing there is practically no danger of scorching the contents of the can when the average temperature of those contents reached 150° F. Since the combustion of the casing material is not dependent on the oxygen from the air the burning is not affected appreciably by any wind which may be present and it has been found that the wind does not appreciably affect the temperature attained by the contents 9.

I have found that if the casing terminates short of the bottom by about ¼ inch the can may be placed on the fender of an automobile without damage to the fender finish when the casing is burned.

Figure 2:
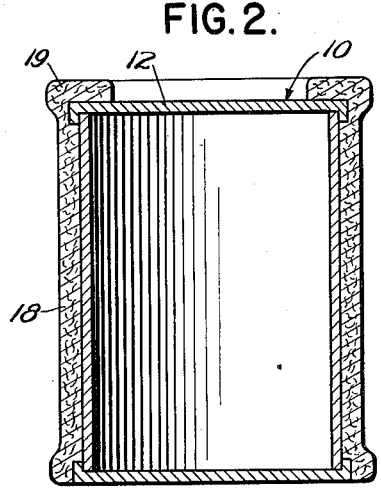
Fig. 2 is a similar view showing a modification of the covering.

Especially when the top 12 is soldered on is it desirable that the casing extend over the soldered rim, as shown by an annulus 19 in Fig. 2, so as to insure melting of the solder.

Figure 3:
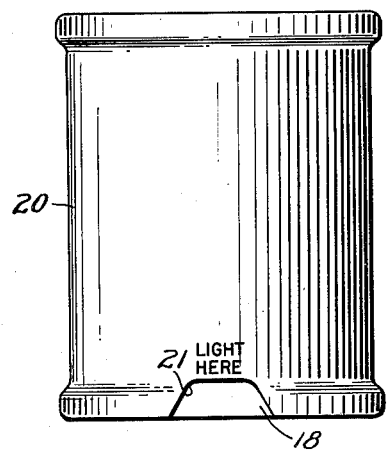
Fig. 3 is a side elevation of the covering showing details thereof.

Although the device is satisfactory with an exposed casing as shown in Fig. 1, it may be desirable to cover the casing with a waterproof wrapper 20 as shown in Fig. 3. This wrapper is preferably combustible, though not fast burning, so that it is consumed with the casing and does not remain to interfere with the handling of the can 10. The wrapper may be of sized paper, regenerated cellulose such as "cellophane" or ordinary paper if a mere label is desired. However many oxidizing agents are frequently contaminated with hygroscopic impurities, such as sodium nitrate in potassium nitrate, so that a moisture-proof wrapper is usually desired.

Since the composition of the casing as described is not easily ignited it is preferable to provide the wrapper with a notch 18 so that a flaring match may be applied directly to the casing.

Figure 4:
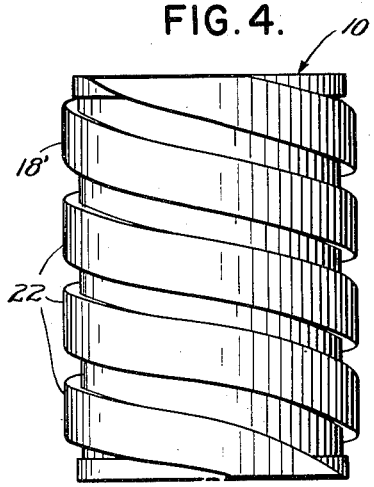
Fig. 4 is a side elevation showing the covering as helical strips.

If the contents 9 are very sensitive to heat the casing may be in the form shown in Fig. 4 wherein a helical covering 18' is used. Thus the heating area is confined to a line moving along one of the helical strips 22 which are separated from each other, thereby enabling the metal of the can 10 to conduct the heat away in all directions (and to the contents) from a small highly heated area. Two or more separated strips may be employed so that one may be ignited after the other has been partially or completely burned away. This, in effect, lengthens the burning time to enable more heat transfer at lower temperatures with respect to the contents adjacent the can walls, but it has the advantage of permitting a high combustion temperature for the strips and thus avoids any danger of the material being accidentally extinguished.

Figure 5:
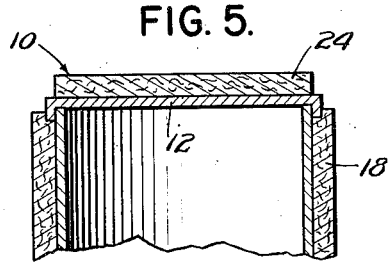
Fig. 5 shows still another form of the covering.

The casing material may also be applied to the ends of the can such as at the top as shown in Fig. 5 wherein a cap 24 is applied.

Figure 6:
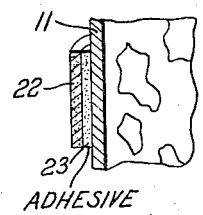
Fig. 6 shows details for securing the strips of Fig. 4 to the can.

The casing material may be applied in any suitable manner to the can with or without adhesives if desired. For example, when it is desired that the casing material be in the form of the helical strips 22, it is preferable that the strips be secured to the can wall 11 by adhesive 23 as shown in Fig. 6. On the other hand if the casing 18 should be tightly fitting and substantially continuous the adhesive may be omitted. The casing 18 may be conveniently applied in the same manner and with the same machinery as conventionally used for labeling cans though not necessarily.

The pressure developed within the can is not dangerous though it can be prevented by merely punching a hole in the top before ignition. Furthermore the soldered joint 15 acts as a safety fuse.

Of course the wrapper 20 may be used with any form of the fuel casing whether cylindrical or helical.

If two helices are employed as in Fig. 4 and they join at the top rim through an annulus as at 19 one helix will burn upwardly until the burning reaches the annulus and then the second helix will burn downwardly. Thus half the heat of combustion will be applied fairly evenly over the entire surface of the cylinder, the metal distributing the heat to each side of the burning helix. Then as the second helix burns downward the remainder of the heat is applied in a similar manner so that the danger of scorching the food is reduced although the total heat imparted to the contents will be substantially the same as though the two helices burned simultaneously.

The invention claimed is:

1. In combination, a cylindrical can and a casing of fibrous combustible material surrounding the curved walls of the can in contact therewith and adhered thereto and exposed to the exterior, said casing being impregnated with an oxidizing agent.

2. In combination, a cylindrical food can, a strip of fibrous combustible material at least $\frac{1}{16}$ inch thick helically wound about the curved exterior walls of the can and adhered thereto, and an oxidizing agent impregnated in said material.

3. In combination, a cylindrical food can, a layer of absorbent combustible material extending 360° around the outer curved wall of the can and adhered thereto, and a solid oxidizing agent impregnated in the material.

4. A combination as in claim 3 said layer being in the form of a helix.

5. A combination as in claim 3 said layer terminating as much as one quarter inch from the bottom of the can.

ERNEST H. STOFEL.

REFERENCES CITED

The following references are of record in the file of this patent:

UNITED STATES PATENTS

| Number | Name | Date |
|---|---|---|
| 263,928 | Manuel | Sept. 5, 1882 |
| 934,711 | Chapman | Sept. 21, 1909 |
| 1,252,909 | Low | Jan. 8, 1918 |
| 1,452,239 | Gutlin | Apr. 17, 1923 |
| 2,374,696 | Naranick | May 1, 1945 |

FOREIGN PATENTS

| Number | Country | Date |
|---|---|---|
| 23,307 | France | June 6, 1921 |
| 313,304 | Germany | 1919 |
| 524,867 | France | May 23, 1921 |